United States Patent
Ben-Eli et al.

(10) Patent No.: US 8,938,016 B1
(45) Date of Patent: Jan. 20, 2015

(54) FAST IDENTIFICATION OF OFDM SIGNAL

(71) Applicant: Marvell International, Ltd., Hamilton (BM)

(72) Inventors: David Ben-Eli, Modiin (IL); Daniel Yellin, Ra'anana (IL)

(73) Assignee: Marvell International Ltd., Hamilton (BM)

( * ) Notice: Subject to any disclaimer, the term of this patent is extended or adjusted under 35 U.S.C. 154(b) by 0 days.

(21) Appl. No.: 14/016,108

(22) Filed: Sep. 1, 2013

Related U.S. Application Data

(60) Provisional application No. 61/702,472, filed on Sep. 18, 2012.

(51) Int. Cl.
  *H04K 1/10* (2006.01)
  *H04L 27/26* (2006.01)

(52) U.S. Cl.
  CPC .................. *H04L 27/2607* (2013.01)
  USPC ....................................... 375/260

(58) Field of Classification Search
  CPC ............ H04L 27/0006; H04L 27/2647; H04L 27/2678
  USPC ....................................... 375/260
  See application file for complete search history.

(56) References Cited

U.S. PATENT DOCUMENTS

| | | | |
|---|---|---|---|
| 6,542,716 B1 | 4/2003 | Dent et al. | |
| 7,035,646 B2 | 4/2006 | Raffel et al. | |
| 7,577,188 B1 * | 8/2009 | Lewis | 375/150 |
| 8,311,576 B2 | 11/2012 | Islam et al. | |
| 8,626,169 B2 | 1/2014 | Lee et al. | |
| 2004/0253952 A1 | 12/2004 | Rager et al. | |
| 2005/0075125 A1 * | 4/2005 | Bada et al. | 455/525 |
| 2006/0068782 A1 | 3/2006 | Kuriyama | |
| 2007/0211669 A1 | 9/2007 | Umatt | |
| 2007/0253319 A1 * | 11/2007 | Jansen | 370/208 |
| 2009/0124224 A1 | 5/2009 | Hildebrand et al. | |
| 2009/0156206 A1 | 6/2009 | Rathonyi et al. | |
| 2009/0270103 A1 | 10/2009 | Pani et al. | |
| 2009/0298497 A1 | 12/2009 | Lee | |
| 2010/0081433 A1 * | 4/2010 | Lee | 455/434 |
| 2010/0091674 A1 | 4/2010 | Sjogren et al. | |
| 2010/0099399 A1 | 4/2010 | Nayak et al. | |

(Continued)

FOREIGN PATENT DOCUMENTS

| | | |
|---|---|---|
| EP | 1422962 A1 | 5/2004 |
| WO | 03063538 A1 | 7/2003 |
| WO | 2011068557 A1 | 6/2011 |

OTHER PUBLICATIONS

U.S. Appl. No. 13/558,351 Office Action dated Mar. 12, 2014.

(Continued)

*Primary Examiner* — Juan A Torres

(57) ABSTRACT

A method includes receiving a signal in a frequency band, which is assignable at least to a communication protocol in which Cyclic Prefixes (CP) are added to symbols having a predefined symbol interval. Multiple autocorrelations of the received signal are computed with a fixed time offset that depends on the symbol interval defined in the communication protocol, and the multiple autocorrelations are accumulated to produce a cumulative autocorrelation. An identification is made, based on the cumulative autocorrelation, whether the received signal is formatted in accordance with the communication protocol.

25 Claims, 4 Drawing Sheets

(56) References Cited

U.S. PATENT DOCUMENTS

| | | |
|---|---|---|
| 2010/0216460 A1 | 8/2010 | Wu |
| 2010/0330977 A1* | 12/2010 | Kadous et al. ............... 455/419 |
| 2011/0122976 A1* | 5/2011 | Lei et al. ..................... 375/340 |
| 2011/0263252 A1 | 10/2011 | Saini et al. |
| 2012/0128086 A1* | 5/2012 | Bouzegzi et al. ............ 375/260 |
| 2012/0140799 A1* | 6/2012 | Lim et al. .................... 375/219 |
| 2012/0236919 A1 | 9/2012 | Alliot et al. |
| 2012/0264425 A1 | 10/2012 | Krishnamoorthy et al. |
| 2013/0028119 A1 | 1/2013 | Ben-Eli |
| 2013/0217386 A1 | 8/2013 | Perets et al. |

OTHER PUBLICATIONS

3GPP TS 45.005, "3rd Generation Partnership Project: Technical Specification Group GSM/EDGE Radio Access Network; Radio Transmission and Reception (release 10)", version 10.1.0, May 2011.

3GPP TS 25.101, "3rd Generation Partnership Project: Technical Specification Group Radio Access Network; User Equipment (UE) Radio Transmission and Reception (FDD) (release 10)", version 10.2.0, Jun. 2011.

3GPP TS 36.101, "3rd Generation Partnership Project: Technical Specification Group Radio Access Network; Evolved Universal Terrestrial Radio Access (E-UTRA); User Equipment (UE) Radio Transmission and reception (release 10)", version 10.3.0, Jun. 2011.

European Patent Application # 13156182 search report dated May 16, 2013.

International Application PCT/IB2012/053812 search report dated Dec. 3, 2012.

U.S. Appl. No. 13/766,798 Office Action dated Jun. 19, 2014.

* cited by examiner

FAST IDENTIFICATION OF OFDM SIGNAL

CROSS-REFERENCE TO RELATED APPLICATIONS

This application claims the benefit of U.S. Provisional Patent Application 61/702,472, filed Sep. 18, 2012, whose disclosure is incorporated herein by reference.

FIELD OF THE DISCLOSURE

The present disclosure relates generally to wireless communication, and particularly to methods and systems for identification of communication protocols.

BACKGROUND

Some wireless communication terminals, such as cellular phones, are able to communicate over multiple frequency bands and multiple Radio Access Technologies (RATs). Examples of RATs are Universal Terrestrial Radio Access (UTRA), also referred to as Wideband Code Division Multiple Access (WCDMA), and Evolved UTRA (E-UTRA), also referred to as Long Term Evolution (LTE) or LTE-Advanced (LTE-A). The specification of each RAT includes a set of operating Radio frequency (RF) bands.

The operating bands for UTRA are specified, for example, in "3rd Generation Partnership Project; Technical Specification Group Radio Access Network; User Equipment (UE) radio transmission and reception (FDD) (Release 10)," 3GPP specification TS 25.101, version 10.2.0, June, 2011, which is incorporated herein by reference. Section 5 of this standard specifies uplink and downlink frequency bands that may be allocated to WCDMA networks.

For E-UTRA, the operating bands are specified, for example, in "3rd Generation Partnership Project; Technical Specification Group Radio Access Network; Evolved Universal Terrestrial Radio Access (E-UTRA); User Equipment (UE) radio transmission and reception (Release 10)," 3GPP specification TS 36.101, version 10.3.0, June, 2011, which is incorporated herein by reference. Section 5 of this standard specifies uplink and downlink frequency bands that may be allocated to LTE networks.

The description above is presented as a general overview of related art in this field and should not be construed as an admission that any of the information it contains constitutes prior art against the present patent application.

SUMMARY

An embodiment that is described herein provides a method including receiving a signal in a frequency band, which is assignable at least to a communication protocol in which Cyclic Prefixes (CP) are added to symbols having a predefined symbol interval. Multiple autocorrelations of the received signal are computed with a fixed time offset that depends on the symbol interval defined in the communication protocol, and the multiple autocorrelations are accumulated to produce a cumulative autocorrelation. An identification is made, based on the cumulative autocorrelation, whether the received signal is formatted in accordance with the communication protocol.

In some embodiments, the method includes deciding that the received signal is formatted in accordance with the communication protocol in response to detecting a predefined peak in the cumulative autocorrelation. In an embodiment, detecting the predefined peak includes calculating a number of samples in which an amplitude of the cumulative autocorrelation exceeds a predefined autocorrelation threshold.

In a disclosed embodiment, identifying whether the received signal is formatted in accordance with the communication protocol includes identifying that the received signal includes an Orthogonal Frequency Division Multiplexing (OFDM) signal. In an embodiment, identifying whether the received signal is formatted in accordance with the communication protocol includes identifying that the received signal includes an Evolved Universal Terrestrial Radio Access (E-UTRA) signal.

In another embodiment, the method includes choosing a time period over which to accumulate the autocorrelations, so as to unconditionally contain one or more reference signals in accordance with the communication protocol. In yet another embodiment, the received signal has a first bandwidth, and computing the multiple autocorrelations includes filtering the received signal using a bank of filters each having a second bandwidth that is narrower than the first bandwidth, so as to produce filtered sub-bands, and computing the autocorrelations over the filtered sub-bands. In an embodiment, the method includes assigning respective soft scores to the filtered sub-bands, and computing an indication of whether the signal in a given frequency channel is formatted in accordance with the communication protocol based on the soft scores of the sub-bands contained in the given frequency channel.

In some embodiments, the frequency band is assignable to the communication protocol having the CP and to at least one other communication protocol, and identifying whether the received signal is formatted in accordance with the communication protocol includes deciding whether the received signal corresponds to the communication protocol having the CP or to the other communication protocol. In an embodiment, the method includes testing the received signal for compliance with the other communication protocol concurrently with computing the cumulative autocorrelation, and terminating testing for the other communication protocol in response to verifying that the received signal is formatted in accordance with the communication protocol having the CP.

In another embodiment, identifying whether the received signal is formatted in accordance with the communication protocol includes producing multiple soft scores for multiple respective frequency channels, and choosing, based on the soft scores, one or more of the frequency channels for synchronizing with the communication protocol. In yet another embodiment, identifying whether the received signal is formatted in accordance with the communication protocol includes producing, based on the cumulative autocorrelation, a hard decision of whether the received signal on a given frequency channel is formatted in accordance with the communication protocol, and deciding based on the hard decision whether or not to perform a synchronization attempt on the given frequency channel.

In still another embodiment the method includes, during an attempt to synchronize to another communication protocol, upon concluding that the signal is not formatted in accordance with the communication protocol having the CP, recalculating the cumulative autocorrelation over subsequent samples of the received signal and retrying to identify whether the received signal is formatted in accordance with the communication protocol having the CP.

There is additionally provided, in accordance with an embodiment that is described herein, an apparatus including a receiver and processing circuitry. The receiver is configured to receive a signal in a frequency band that is assignable at least to a communication protocol in which Cyclic Prefixes (CP) are added to symbols having a predefined symbol interval. The processing circuitry is configured to compute multiple autocorrelations of the received signal with a fixed time offset that depends on the symbol interval defined in the communication protocol, to accumulate the multiple autocorrelations so as to produce a cumulative autocorrelation, and to identify, based on the cumulative autocorrelation, whether the received signal is formatted in accordance with the communication protocol.

In some embodiments, a mobile communication terminal includes the disclosed apparatus. In some embodiments, a chipset for processing signals in a mobile communication terminal includes the disclosed apparatus.

The present disclosure will be more fully understood from the following detailed description of the embodiments thereof, taken together with the drawings in which:

DETAILED DESCRIPTION OF EMBODIMENTS

Figure 1:
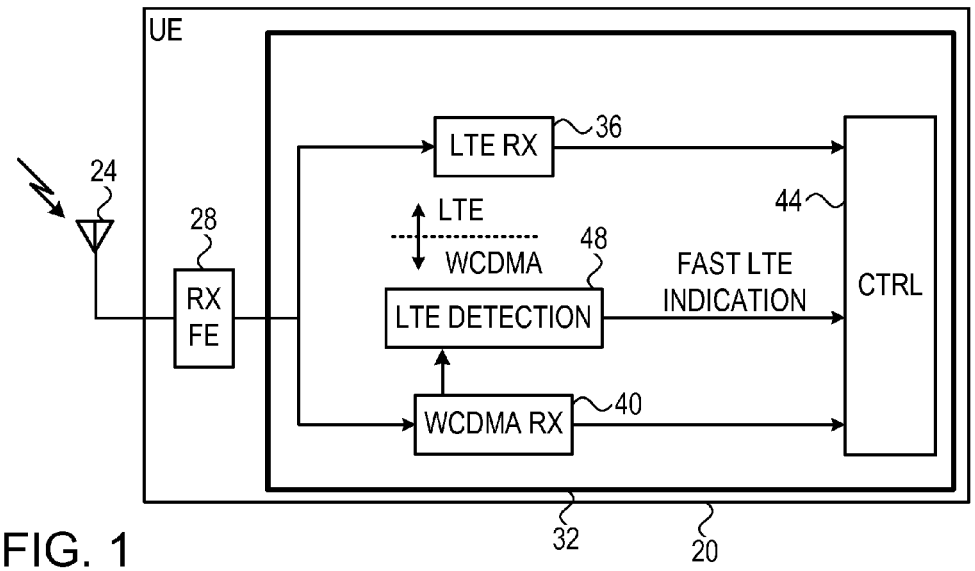
FIG. 1 is a block diagram that schematically illustrates a mobile communication terminal, in accordance with an embodiment that is described herein.

In various scenarios, it is desirable for a mobile communication terminal to rapidly detect whether a received signal corresponds to a given communication protocol or not. For example, mobile communication terminals typically support a process of searching the operating bands they support, in order to select a suitable Public Land Mobile Network (PLMN) on which to operate. Such a process is referred to as PLMN search. When the terminal supports multiple RATs having different communication protocols, the PLMN search process may be long and power consuming. A fast protocol detection mechanism enables the terminal to conduct a faster and more efficient PLMN search.

Embodiments that are described herein provide methods and systems for rapid communication protocol identification. The disclosed embodiments focus on identifying communication protocols in which Cyclic Prefixes (CPs) are appended to respective symbols of the transmitted signal. The E-UTRA (LTE and LTE-A) protocols, for example, specify the use of Orthogonal Frequency Division Multiplexing (OFDM) modulation with CP.

A signal that comprises cyclic prefixes typically exhibits high autocorrelation at a particular time offset corresponding to the symbol interval. In the disclosed embodiments, a mobile communication terminal uses this property to assess whether a received signal is of the protocol in question or not.

In some embodiments, the terminal computes multiple autocorrelations of the received signal at multiple points in time. The multiple autocorrelations are all computed with a fixed time offset that depends on the symbol interval. The terminal accumulates the multiple autocorrelations, so as to produce a cumulative autocorrelation.

If the received signal is of the sought after communication protocol, its cumulative autocorrelation typically exhibits a well-defined peak caused by the cyclic prefixes. The accumulation of multiple autocorrelations helps to enhance the peak and average-out the autocorrelation outside the peak. In an embodiment, the terminal uses the presence or absence of such a peak in the cumulative autocorrelation for identifying the protocol. Since this mechanism does not require actual decoding or acquisition of the protocol, the terminal is able to detect the protocol quickly, e.g., within several milliseconds.

In some embodiments, the terminal uses the disclosed technique to distinguish between LTE and non-LTE signals, e.g., as part of a PLMN search process used in frequency bands that are assignable to both LTE (which is OFDM-based) and WCDMA (which is not OFDM-based). The fast detection mechanism shortens the PLMN search process, and therefore improves the user experience and further reduces the terminal power consumption.

The disclosed technique is especially attractive for distinguishing between LTE and WCDMA, because the spectra of LTE and WCDMA signals are often similar. In practice it is often difficult and unreliable to distinguish between these protocols using spectral measurements or criteria. The disclosed autocorrelation-based technique is both fast and reliable in this application. Nevertheless, the disclosed techniques are applicable to various other communication protocols that use CP.

FIG. 1 is a block diagram that schematically illustrates a mobile communication terminal 20, also referred to as User Equipment (UE), in accordance with an embodiment that is described herein. In the present example, UE 20 is capable of communicating with both WCDMA (UTRA) base stations and LTE (E-UTRA) base stations. The base stations are also referred to as NodeB or eNodeB.

In the embodiment of FIG. 1, UE 20 comprises one or more antennas 24 for receiving downlink signals from base stations, a receiver front end (RX FE) 28 and processing circuitry 32. RX FE 28 down-converts the received signals to baseband, and typically performs additional functions such as filtering and gain control. The resulting baseband signal is provided to processing circuitry 32 for processing. Processing circuitry 32 comprises an LTE receiver 36 that is configured to receive LTE signals, and a WCDMA receiver 40 that is configured to receive WCDMA signals. A control unit 44 manages the operation of processing circuitry 32, including the operation of receivers 36 and 40.

Among other tasks, control unit 44 of processing circuitry 32 carries out a PLMN search process, for example at power-up, during roaming, after return from out-of-service conditions, in emergency mode or at the request of the user. In some embodiments, processing circuitry 32 further comprises an LTE detection module 48 that is configured to rapidly detect whether a received signal is an LTE signal or not. The detection techniques used by module 48, and the use of these techniques as part of the PLMN search process, are explained in detail below.

The UE configuration shown in FIG. 1 is an example configuration, which is depicted solely for the sake of clarity. In alternative embodiments, any other suitable UE configuration can be used. For example, although the embodiments described herein refer mainly to LTE, the disclosed techniques can be used for detection of any other suitable protocol that uses cyclic prefixes. In the disclosed embodiments the protocol uses OFDM modulation, but the disclosed techniques are not limited to OFDM and are applicable to other suitable modulation types, as well.

Some UE elements that are not mandatory for understanding of the disclosed techniques, for example transmission circuitry of the UE, have been omitted from the figures for the sake of clarity. The different UE elements are typically implemented using dedicated hardware, such as using one or more Application-Specific Integrated Circuits (ASICs), Radio frequency Integrated Circuits (RFIC) and/or Field-Programmable Gate Arrays (FPGAs). Alternatively, some UE elements (e.g., LTE detection 48 and/or control unit 44) may be implemented using software executing on programmable hardware, or using a combination of hardware and software elements.

In some embodiments, some elements of UE 20 may be fabricated in a chip-set. When implementing the disclosed techniques in software on a programmable processor, the software may be downloaded to the processor in electronic form, over a network, for example, or it may, alternatively or additionally, be provided and/or stored on non-transitory tangible media, such as magnetic, optical or electronic memory.

The description that follows explains the fast LTE protocol identification technique carried out by LTE detection module 48. The use of this technique as part of a PLMN search process is addressed further below.

One of the characteristics of the downlink signals transmitted by LTE base stations is that each transmitted symbol is appended with a Cyclic Prefix (CP). Because of the CP, the beginning and end of a symbol are the same. Therefore, the signal autocorrelation exhibits a well-defined peak at a time offset that matches the symbol interval.

The LTE signal comprises a sequence of Orthogonal Frequency Division Multiplexing (OFDM) symbols, each appended with a CP at the end of the symbol, in an embodiment. (In alternative embodiment, the CP may be added to the symbols in any other suitable way or position, e.g., at the beginning of the symbol.) In an LTE signal with normal CP, each slot comprises seven OFDM symbols. Each symbol is 66.66 µS long, to which CP is added, in an embodiment. The CP length is 5.2 µS for the first symbol in the slot, and 4.7 µS for the other six symbols. Thus, for a sampling rate of 7.68 Msps, the symbol time (before adding the CP) is equivalent to 512 samples. The CP length is equivalent to forty samples for the first OFDM symbol, and thirty-six samples for the remaining six symbols. The autocorrelation this signal exhibits a 5.2 µS-wide peak at a time offset of 72 µS (corresponding to the first symbol), and a 4.7 µS-wide peak at a time offset of 71.3 µS (corresponding to the other symbols).

In some embodiments, LTE detection module 48 identifies whether or not a received signal is an LTE signal by:
  Computing multiple autocorrelations of the received signal at multiple points in time, with a fixed time offset that matches the symbol interval (including the CP).
  Accumulating the multiple autocorrelations, so as to produce a cumulative autocorrelation.
  Checking whether the cumulative autocorrelation comprises a well-defined peak having the expected amplitude, timing and/or width.

Figure 2:
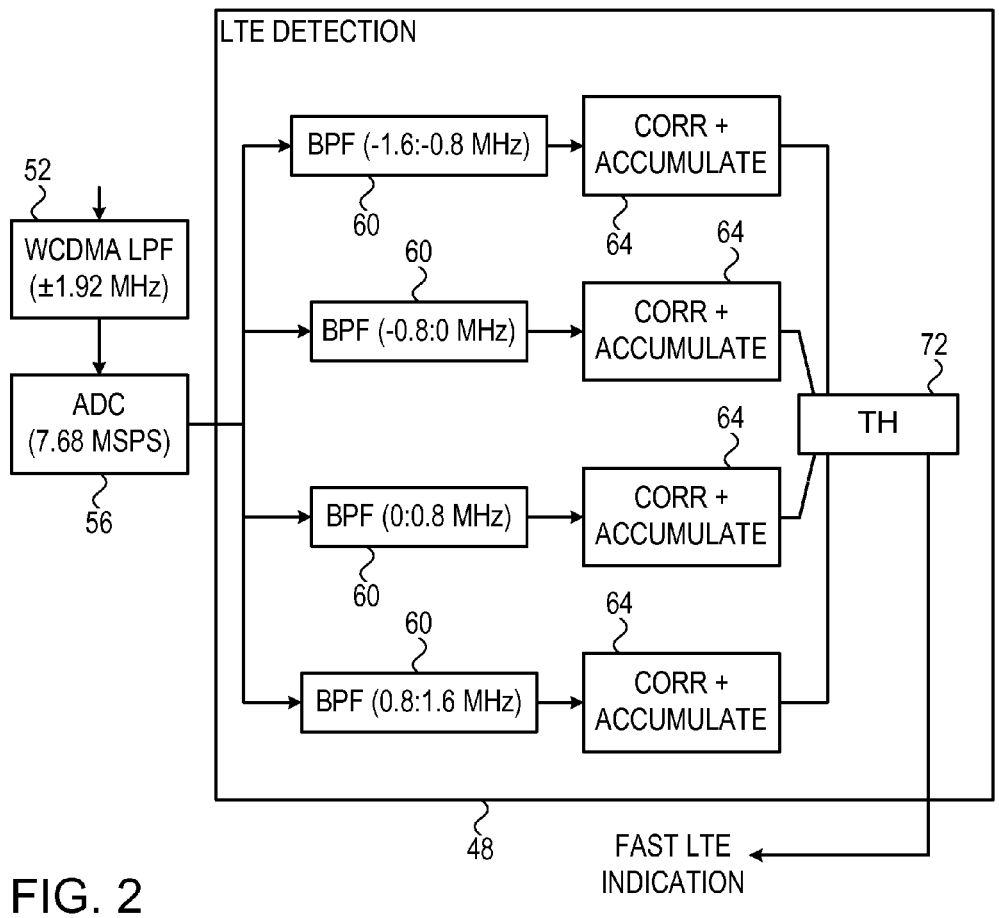
FIG. 2 is a block diagram that schematically illustrates an LTE detection module, in accordance with an embodiment that is described herein.

FIG. 2 is a block diagram that schematically illustrates LTE detection module 48, in accordance with an embodiment that is described herein. In this example, LTE detection module 48 receives the signal from WCDMA RX 40, following filtering by a WCDMA Low Pass Filter (LPF) 52 and digitization with an Analog-to-Digital Converter (ADC) 56, in an embodiment. The bandwidth of WCDMA LPF 52 is ±1.92 MHz (3.84 MHz double-sided bandwidth), and the sampling rate of ADC 56 is 7.68 Msps, in an embodiment.

In this embodiment, module 48 receives a ~3.8 MHz-wide spectral slice from ADC 56, and detects the presence or absence of an LTE signal in this spectral slice. Module 48 splits the signal to four processing channels, each channel comprising a respective digital Band Pass Filter (BPF) 60 and a respective Correlation and Accumulation module 64. Each BPF has a bandwidth of 800 kHz, and the filters cover adjacent 800 kHz sub-bands, in an embodiment. In this example the filter pass-bands are [−1.6 MHz÷−0.8 MHz], [−0.8 MHz÷0 MHz], [0 MHz÷0.8 MHz] and [0.8 MHz÷1.6 MHz].

Each Correlation and Accumulation module computes multiple autocorrelations of the signal at its input, at multiple points in time, and accumulates the multiple autocorrelations. Each autocorrelation is computed with a fixed time offset D that matches the 66.66 µS symbol interval (equivalent to 512 samples at the 7.68 Msps sampling rate).

In an embodiment, each Correlation and Accumulation module 64 computes the numerator and denominator of the following metric:

$$M_1(t) = \frac{\left| \sum_{n \in CP} x(t+n) \cdot x*(t+n-D) \right|}{\sum_{n \in CP} |x(t+n)| \cdot |x*(t+n-D)|} \quad \text{Equation 1}$$

wherein x( ) denotes the complex signal at the output of the respective BPF 60, and ( )* denotes complex conjugation. The summation in the autocorrelation computation is performed over thirty-six samples (4.7 µS at the 7.68 Msps sampling rate).

Each Correlation and Accumulation module then refines the metric $M_1(t)$ over a duration of several OFDM symbols, to produce:

$$M_2(t) = \frac{\left| \sum_{s=0}^{L-1} \sum_{n \in CP} x(t+s \cdot T + n) \cdot x*(t+s \cdot T + n - D) \right|}{\sum_{s=0}^{L-1} \sum_{n \in CP} |x(t+s \cdot T + n)| \cdot |x*(t+s \cdot T - D)|} \quad \text{Equation 2}$$

wherein t=1 . . . T, T=D+CP=548 samples at 7.68 Msps, and L denotes the number of OFDM symbols over which $M_1(t)$ is calculated.

A value of L=8 was found by simulation to provide good differentiation between LTE and non-LTE signals, although any other suitable period can be used. Another reason for calculating the autocorrelations over at least L=8 symbols is to reduce sensitivity to the load level of the base station (cell) from which the signal is received. When the cell is not heavily loaded, many of the time-frequency bins may have no signal energy. Under these conditions, module 48 calculates the autocorrelations over Common Reference Signals (CRS) that are present regardless of user activity. Choosing the calculation period to be at least L=8 symbols ensures that the processed signal will include at least three OFDM symbols that comprise CRS.

In some embodiments, module 48 is not synchronized to the LTE slot boundary, and therefore does not differentiate between the first OFDM symbol (having a slightly longer CP) and the remaining OFDM symbols. In these embodiments, module 48 computes the autocorrelations as if all symbols have a 4.7 µS CP. This solution may limit the maximum value of L. Nevertheless, the disclosed technique still provides sufficiently accurate results in the presence of this inaccuracy.

The outputs of the four Correlation and Accumulation modules 64 are processed by a threshold unit 72, which verifies whether or not the cumulative autocorrelation comprises a peak that is indicative of an LTE signal. The output of unit 72 is referred to as a fast LTE indication, or simply LTE indication. Threshold unit 72 may use various criteria for deciding whether the cumulative autocorrelation is indicative of an LTE signal.

In an example embodiment, unit 72 produces a respective LTE indication for each 200 kHz frequency bin in the band in question. In this embodiment, the LTE indication of a bin f is calculated as the number of samples t in $M_2(t)$ that pass a threshold, i.e., $Ind(f)=\Sigma(1\{M_2(t)>Threshold\})$, wherein $1\{x\}=1$ if x is true and $1\{x\}=0$ otherwise. In the present example Threshold=0.5, although any other suitable threshold value can be used. In the example of FIG. 2, module 48 assigns the same indication value for all four LTE indications assigned per bin in each 800 kHz sub-band, i.e., a total of sixteen LTE indications per 3.2 MHz channel (this operation is performed per 200 kHz bin, irrespective of the 3G signal BW).

In other words, module 48 of FIG. 2 generates a soft indication (or soft score) per each 800 kHz chunk. This calculation is performed over the entire radio band whose bandwidth is given in the TS 25.101 or TS 36.101 specification. Typically, controller 44 moves the center frequency of RX FE 28 by 3.2 MHz at a time, and module 48 generates the four M2 metrics per 800 kHz chunk. This process gives a set of LTE indications of the form $Ind(f)=sum, (1\{M2(t)>Threshold\})$ for the whole band. The same indication value is set for all four 200 kHz bins within the 800 kHz frequency chunk. Then, an LTE score of the form $LTE\_SCORE(f)=\Sigma_{n=-8}^{8}Ind(f+n\cdot200 kHz)$ is calculated by controller 44, producing a respective score per 3G ARFCN (frequency center of an assumed 3G channel) that is the sum of the soft indications of the sixteen bins in the assumed 3G channel.

The LTE score defined above can be used by controller 44 to generate a hard decision of whether the signal in question is an LTE signal or not. Alternatively, the LTE score can be used in a soft form, for example by adding it with some weight to a decision of whether the signal in question is a channel that should further be scanned to try and lock on.

Figure 3:
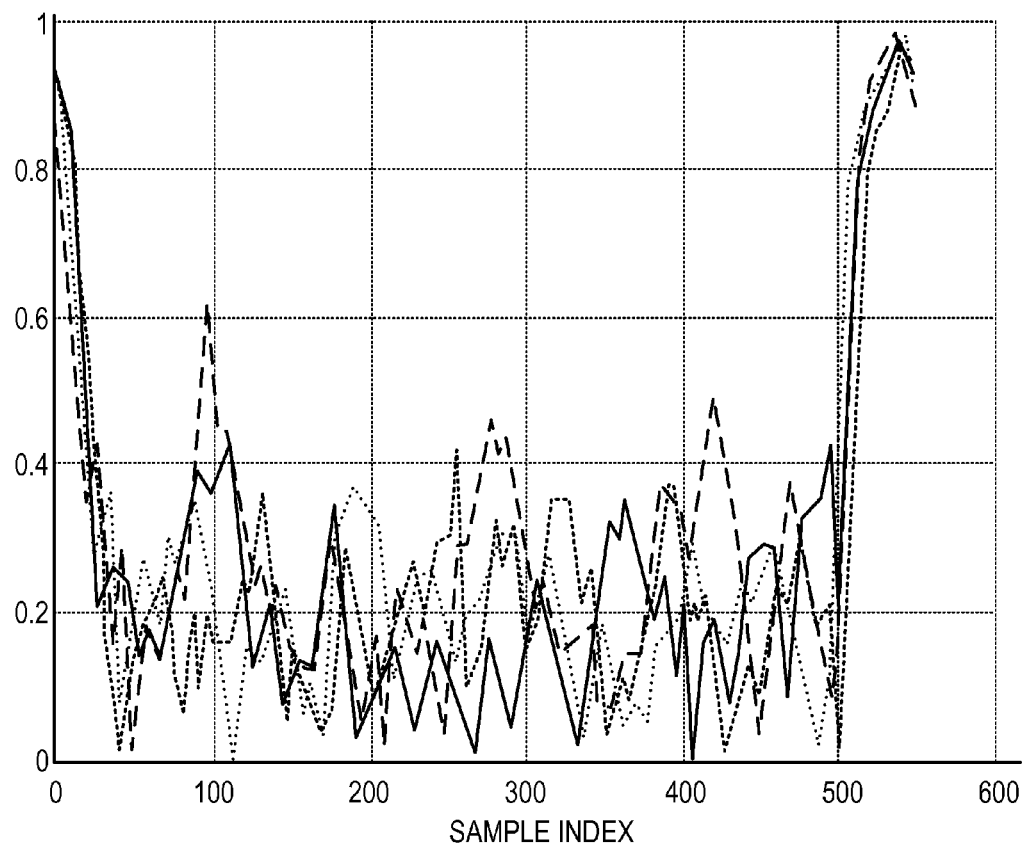
FIG. 3 is a graph showing example autocorrelations of an LTE signal, in accordance with an embodiment that is described herein.

FIG. 3 is a graph showing example autocorrelations of an LTE signal, in accordance with an embodiment that is described herein. The figure shows a simulated example of four $M_2(t)$ metrics produced respectively by the four processing channels of LTE detection module 48, in response to an LTE signal. As can be seen in the figure, all four $M_2(t)$ metrics exhibit a well-defined peak caused by the LTE CP.

Figure 4:
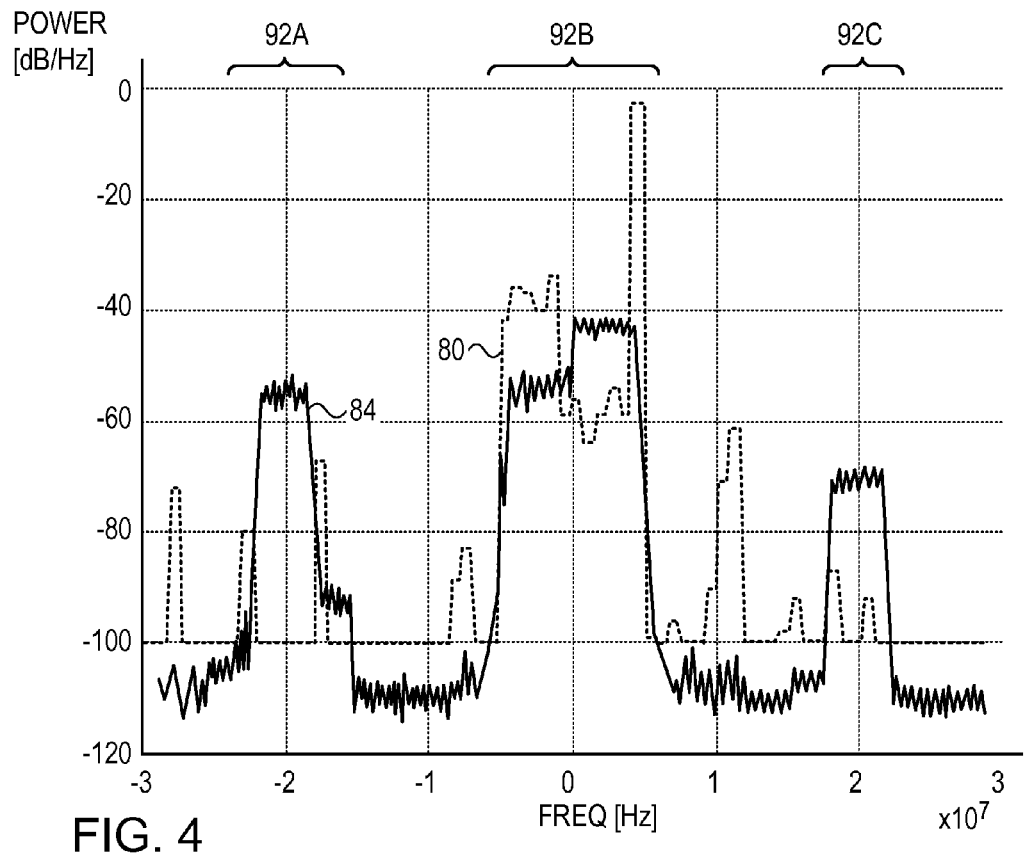
FIG. 4 is a graph showing an example signal spectrum and corresponding LTE detection indications, in accordance with an embodiment that is described herein.

FIG. 4 is a graph showing an example simulated signal spectrum and corresponding LTE detection indications, in accordance with an embodiment that is described herein. The figure covers a band of –60 MHz. A curve 84 gives the power spectral density measured across this band. A curve 80 gives the LTE indication generated per 200 kHz bin by unit 48. (Curve 80 has a linear scale and was scaled down by 100 for convenience, in order to present it on the same scale as curve 84.) Curves of this sort over 60 MHz can be produced, for example, by setting RX FE 28 (FIG. 1) to multiple radio frequencies, e.g., at 3.2 MHz spacing. This spacing is derived from the WCDMA receive filter bandwidth (bandwidth of filter 52 in FIG. 2).

The figure shows three spectral regions 92A . . . 92C that contain considerable signal energy. Judging by spectral shape and bandwidth alone, regions 92A and 92C could each comprise either a WCDMA carrier or a 5 MHz LTE carrier, and region 92B could comprise a 10 MHz LTE signal or two adjacent WCDMA carriers.

The LTE indication of module 48 (illustrated by curve 80) distinguishes reliably between LTE and non-LTE signals. As can be seen in the figure, the LTE indication of module 48 is low in regions 92A and 92C, and high in region 92B. Thus, in an embodiment, control unit 44 concludes that the signals in regions 92A and 92C are WCDMA carriers, and the signal in region 92B is a 10 MHz LTE signal. In this simulated example the channel is assumed to be an Additive White Gaussian Noise (AWGN) channel, and the WCDMA cells are weaker by 15 dB and 30 dB than the LTE cell, which operates at 50% load.

The example of FIG. 4 demonstrates the effectiveness of the disclosed techniques in distinguishing between LTE and non-LTE signals, even in difficult scenarios in which spectral criteria are likely to fail.

As explained above, in some embodiments control unit 44 assigns each UTRA Absolute Radio Frequency Channel Number (UARFCN) a respective score, which is indicative of the likelihood that this UARFCN contains a valid WCDMA signal. In these embodiments, control unit 44 calculates the score of a certain UARFCN f depending on the LTE indication of this UARFCN, as produced by LTE detection module 48.

In one embodiment, control unit 44 calculates:

$$LTE\_SCORE(f) = \sum_{n=-8}^{8} Ind(f + n \cdot 200 \text{ kHz}) \qquad \text{Equation 3}$$

and then adds to the total score:

$$LTE\_PENALTY(ii) = \qquad \text{Equation 4}$$
$$(\max\{LTE\_SCORE(ii), LTE\_LOW\_TH\} - LTE\_LOW\_TH) \cdot$$
$$NORM\_LTE$$

wherein one possible set of parameters is LTE_LOW_TH=400 and NORM_LTE=0.02. Alternatively, any other suitable scoring scheme can be used.

In some embodiments, LTE detection module 48 decimates the output of filters 60 in order to reduce the computational complexity of calculating the cumulative autocorrelation. In an example embodiment, the 7.68 Msps signal is decimated by a factor of four to 1.92 Msps with little or no degradation in performance. After decimation, module 48 calculates the autocorrelations using D=512/4=128 samples, CP=36/4=9 samples and T=548/4=137 samples. Alternatively, any other suitable decimation factor can be used.

Typically, although not necessarily, LTE detection module 48 computes the cumulative autocorrelation in real time, during the PLMN search. Real-time computation of this sort is computationally demanding. In some embodiments, instead of $M_2(t)$, LTE detection module 48 uses an alternative calculation for the cumulative autocorrelation, which has lower computational complexity. The cumulative autocorrelation in these embodiments is given by:

$$M_3(t) = \frac{\left|\sum_{s=0}^{L-1} \sum_{n \in CP} x(t+s \cdot T+n) \cdot x*(t+s \cdot T+n-D)\right|}{\sum_{s=0}^{L-1} \sum_{n \in CP} |x(t+s \cdot T+n)|^2}$$ Equation 5

The difference between $M_2(t)$ and $M_3(t)$ is in the normalization factor, which is simpler in $M_3(t)$. Further alternatively, module 48 may use any other suitable computation or approximation for calculating the cumulative autocorrelation.

In some embodiments, module 48 does not carry out the LTE detection computation during the scoring stage of the PLMN search, but at a later stage in which the UE attempts to synchronize with a WCDMA cell on a given UARFCN. In these embodiments, module 48 operates in parallel to the WCDMA synchronization attempt. If module 48 identifies that the signal is actually an LTE signal, control unit 44 aborts the WCDMA synchronization attempt on this UARFCN. Since the LTE indication computation is fast, control unit 44 is able to abort the WCDMA synchronization attempt after ~5 mS (instead of several hundreds of mS that would conventionally be needed for the WCDMA synchronization attempt to declare failure).

In these embodiments, it is not necessary for module 48 to split the 3.84 MHz bandwidth into four separate processing channels. Module 48 in these embodiments calculates the LTE indication (e.g., $M_2(t)$ or $M_3(t)$) for the entire 3.84 MHz bandwidth. In other words, module 48 verifies the entire 7.68 Msps sampled signal on a given UARFCN, and verifies whether this signal is a valid LTE signal. In an alternative embodiment, module 48 decimates the 7.68 Msps sampled signal by a factor of two, and computes the LTE indication over the resulting 3.84 Msps sampled signal.

Figure 5:
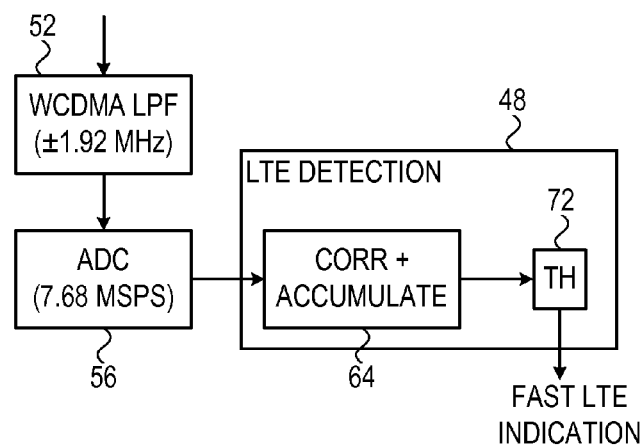
FIG. 5 is a block diagram that schematically illustrates an LTE detection module, in accordance with an alternative embodiment that is described herein.

FIG. 5 is a block diagram that schematically illustrates an LTE detection module, in accordance with an alternative embodiment that is described herein. In this example, module 48 processes the entire 7.68 Msps sampled signal using a single module without band-pass filtering. Threshold unit 72 calculates $\text{Ind}(f) = \Sigma(1\{M_2(t) > \text{Threshold}\})$. The fast LTE indication is produced based on the threshold comparison.

Note that in the scheme of FIG. 2, the fast LTE indication was calculated before trying to synchronize on any UARFCN. The LTE score was calculated during the score calculation per UARFCN, and served as part of the total score that decides which UARFCN to try and synchronize on. In the scheme of FIG. 5, on the other hand, the score and selection of UARFCNs to sync on do not depend on the fast LTE indicator. Instead, the fast LTE indicator is used during the synchronization procedure, to abort the procedure prematurely if the signal is found to be a LTE signal.

In some embodiments, module 48 uses two thresholds denoted Th1 and Th2. In an example embodiment, TH1 is set to 0.5, and is compared against M2 or M3 when calculating $1\{M(t) > \text{Th1}\}$. Th2 is compared against the entire indicator, in order to decide whether the signal is an LTE signal or not. As $\text{Ind}(f) = \Sigma(1\{M_2(t) > \text{Th1}\})$, module 48 checks whether Ind(f) is above or below Th2 to decide whether the signal is an LTE or non-LTE signal, respectively. Note that since ideally the CP length is thirty-six samples, the $M_2(t)$ result for an LTE signal is expected to have roughly thirty-six samples above Th1. Therefore, Th2 is set at roughly half this value (e.g., 15-20) to distinguish between LTE and non-LTE signal.

Figure 6:
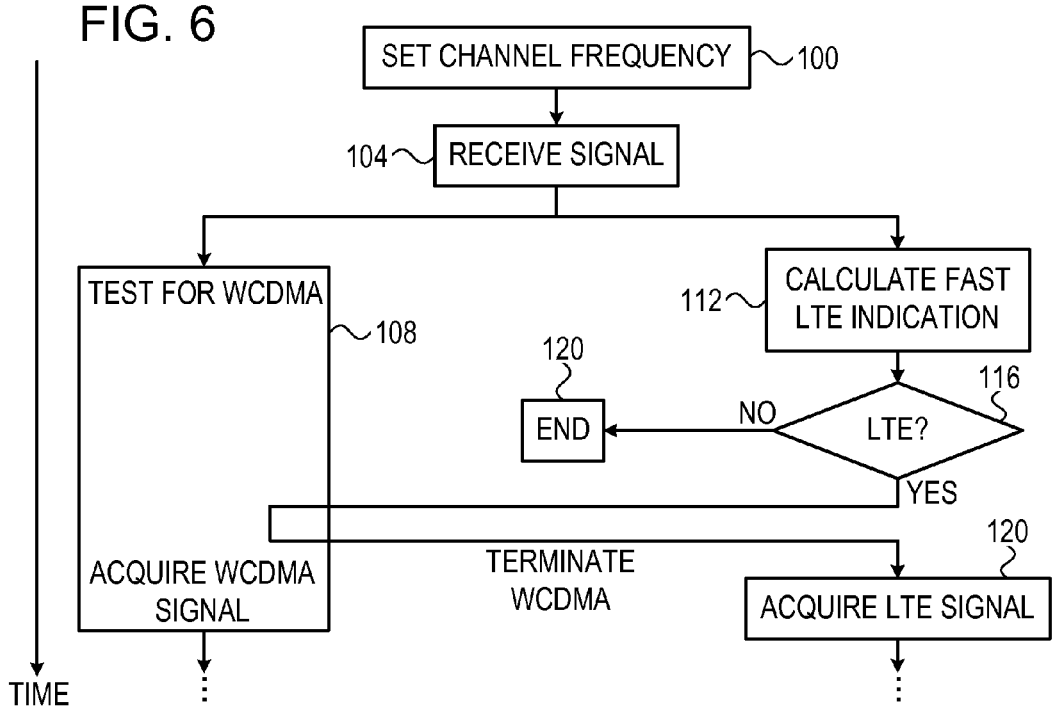
FIG. 6 is a flow chart that schematically illustrates a method for fast LTE signal detection, in accordance with an embodiment that is described herein.

FIG. 6 is a flow chart that schematically illustrates a method for fast LTE signal detection, in accordance with an embodiment that is described herein. This method is depicted purely by way of example, in order to demonstrate the effectiveness of the disclosed LTE detection techniques in improving PLMN search processes. In alternative embodiments, the disclosed LTE detection techniques can be used in PLMN search processes in any other suitable way.

In the example of FIG. 6, UE 20 first scans a certain group of channel frequencies (e.g., UARFCNs), which was previously marked as potentially containing WCDMA signals. For each UARFCN in the group, the UE attempts to synchronize to a WCDMA cell. Since the WCDMA synchronization attempt may be lengthy if the signal is not a valid WCDMA signal of reasonable quality, the UE carries out the disclosed fast LTE detection process in parallel on this UARFCN. If the LTE detection process detects a valid LTE signal, the UE aborts the WCDMA synchronization attempt.

The method of FIG. 6 begins with control unit 44 of UE 20 setting RX FE 28 to receive a desired UARFCN, at a frequency setting operation 100. RX FE 28 receives the signal, at a reception operation 104.

WCDMA RX 40 attempts to synchronize to a WCDMA cell on the UARFCN, at a WCDMA testing operation 108. This operation is relatively lengthy, e.g., on the order of 500 mS. In parallel to operation 108, LTE detection module 48 calculates a fast LTE indication for this UARFCN, at an LTE detection operation 112.

Control unit 44 checks whether the LTE indication produced by module 48 is indicative of an LTE signal, at a checking operation 116. If not, this branch of the method terminates, at a termination operation 120. Operation 108 proceeds, and may result with either success or failure to synchronize to a WCDMA cell.

If, on the other hand, checking operation 116 concludes that the LTE indication produced by module 48 is indicative of an LTE signal, there is no need for the UE to continue the attempt to synchronize to a WCDMA cell on this UARFCN. Therefore, control unit 44 terminates operation 108. In some embodiments, control unit 44 reverts to acquire the LTE signal on this UARFCN. Alternatively, the control unit may take any other suitable action. The process of FIG. 6 is typically repeated over multiple UARFCNs that were pre-identified as potentially containing a WCDMA signal.

The method of FIG. 6 is an example method that is depicted purely for the sake of clarity. In alternative embodiments, the fast LTE indication computation process can be used in any other way as part of a PLMN search process. For example, if, during a WCDMA synchronization attempt, the fast LTE indication concludes that the signal is not an LTE signal, module 48 may re-calculate the fast LTE indication over new signal samples, and retry to identify whether the signal is an LTE signal or not.

It is noted that the embodiments described above are cited by way of example, and that the present invention is not limited to what has been particularly shown and described hereinabove. Rather, the scope of the present invention includes both combinations and sub-combinations of the various features described hereinabove, as well as variations and modifications thereof which would occur to persons skilled in the art upon reading the foregoing description and which are not disclosed in the prior art. Documents incorporated by reference in the present patent application are to be considered an integral part of the application except that to the extent any terms are defined in these incorporated documents in a manner that conflicts with the definitions made explicitly or implicitly in the present specification, only the definitions in the present specification should be considered.

The invention claimed is:

1. A method, comprising:
   receiving a signal in a frequency band, which is assignable at least to a communication protocol in which Cyclic Prefixes (CP) are added to symbols having a predefined symbol interval;
   computing multiple autocorrelations of the received signal with a fixed time offset that depends on the symbol interval defined in the communication protocol, and accumulating the multiple autocorrelations to produce a cumulative autocorrelation; and
   identifying, based on the cumulative autocorrelation, whether the received signal is formatted in accordance with the communication protocol.

2. The method according to claim 1, comprising deciding that the received signal is formatted in accordance with the communication protocol in response to detecting a predefined peak in the cumulative autocorrelation.

3. The method according to claim 1, wherein identifying whether the received signal is formatted in accordance with the communication protocol comprises identifying that the received signal comprises an Orthogonal Frequency Division Multiplexing (OFDM) signal.

4. The method according to claim 1, wherein identifying whether the received signal is formatted in accordance with the communication protocol comprises identifying that the received signal comprises an Evolved Universal Terrestrial Radio Access (E-UTRA) signal.

5. The method according to claim 1, comprising choosing a time period over which to accumulate the autocorrelations, so as to unconditionally contain one or more reference signals in accordance with the communication protocol.

6. The method according to claim 1, wherein the received signal has a first bandwidth, and wherein computing the multiple autocorrelations comprises filtering the received signal using a bank of filters each having a second bandwidth that is narrower than the first bandwidth, so as to produce filtered sub-bands, and computing the autocorrelations over the filtered sub-bands.

7. The method according to claim 1, wherein the frequency band is assignable to the communication protocol having the CP and to at least one other communication protocol, and wherein identifying whether the received signal is formatted in accordance with the communication protocol comprises deciding whether the received signal corresponds to the communication protocol having the CP or to the other communication protocol.

8. The method according to claim 1, wherein identifying whether the received signal is formatted in accordance with the communication protocol comprises producing multiple soft scores for multiple respective frequency channels, and choosing, based on the soft scores, one or more of the frequency channels for synchronizing with the communication protocol.

9. The method according to claim 1, wherein identifying whether the received signal is formatted in accordance with the communication protocol comprises producing, based on the cumulative autocorrelation, a hard decision of whether the received signal on a given frequency channel is formatted in accordance with the communication protocol, and deciding based on the hard decision whether or not to perform a synchronization attempt on the given frequency channel.

10. The method according to claim 1, comprising, during an attempt to synchronize to another communication protocol, upon concluding that the signal is not formatted in accordance with the communication protocol having the CP, recalculating the cumulative autocorrelation over subsequent samples of the received signal and retrying to identify whether the received signal is formatted in accordance with the communication protocol having the CP.

11. The method according to claim 2, wherein detecting the predefined peak comprises calculating a number of samples in which an amplitude of the cumulative autocorrelation exceeds a predefined autocorrelation threshold.

12. The method according to claim 6, and comprising assigning respective soft scores to the filtered sub-bands, and computing an indication of whether the signal in a given frequency channel is formatted in accordance with the communication protocol based on the soft scores of the sub-bands contained in the given frequency channel.

13. The method according to claim 7, comprising testing the received signal for compliance with the other communication protocol concurrently with computing the cumulative autocorrelation, and terminating testing for the other communication protocol in response to verifying that the received signal is formatted in accordance with the communication protocol having the CP.

14. Apparatus, comprising:
    a receiver, which is configured to receive a signal in a frequency band that is assignable at least to a communication protocol in which Cyclic Prefixes (CP) are added to symbols having a predefined symbol interval; and
    processing circuitry, which is configured to compute multiple autocorrelations of the received signal with a fixed time offset that depends on the symbol interval defined in the communication protocol, to accumulate the multiple autocorrelations so as to produce a cumulative autocorrelation, and to identify, based on the cumulative autocorrelation, whether the received signal is formatted in accordance with the communication protocol.

15. The apparatus according to claim 14, wherein the processing circuitry is configured to decide that the received signal is formatted in accordance with the communication protocol in response to detecting a predefined peak in the cumulative autocorrelation.

16. The apparatus according to claim 14, wherein the processing circuitry is configured to identify that the received signal comprises an Orthogonal Frequency Division Multiplexing (OFDM) signal.

17. The apparatus according to claim 14, wherein the processing circuitry is configured to identify that the received signal comprises an Evolved Universal Terrestrial Radio Access (E-UTRA) signal.

18. The apparatus according to claim 14, wherein the processing circuitry is configured to choose a time period over which to accumulate the autocorrelations, so as to unconditionally contain one or more reference signals in accordance with the communication protocol.

19. The apparatus according to claim 14, wherein the received signal has a first bandwidth, and wherein the processing circuitry is configured to filter the received signal using a bank of filters each having a second bandwidth that is narrower than the first bandwidth, so as to produce filtered sub-bands, and to compute the autocorrelations over the filtered sub-bands.

20. The apparatus according to claim 14, wherein the frequency band is assignable to the communication protocol and to at least one other communication protocol, and wherein the processing circuitry is configured to decide whether the received signal corresponds to the communication protocol having the CP or to the other communication protocol.

21. A mobile communication terminal comprising the apparatus of claim 14.

22. A chipset for processing signals in a mobile communication terminal, comprising the apparatus of claim 14.

23. The apparatus according to claim 15, wherein the processing circuitry is configured to detect the predefined peak by calculating a number of samples in which an amplitude of the cumulative autocorrelation exceeds a predefined autocorrelation threshold.

24. The apparatus according to claim 19, wherein the processing circuitry is configured to assign respective soft scores to the filtered sub-bands, and to compute an indication of whether the signal in a given frequency channel is formatted in accordance with the communication protocol based on the soft scores of the sub-bands contained in the given frequency channel.

25. The apparatus according to claim 20, wherein the processing circuitry is configured to test the received signal for compliance with the other communication protocol concurrently with computing the cumulative autocorrelation, and to terminate testing for the other communication protocol in response to verifying that the received signal is formatted in accordance with the communication protocol having the CP.

\* \* \* \* \*